United States Patent [19]
Furlani et al.

[11] Patent Number: 5,687,417
[45] Date of Patent: Nov. 11, 1997

[54] ELECTROMAGNETIC ACTUATOR FOR PROVIDING A HARD STOP FOR MOVING BLADE APERTURE SYSTEMS

[75] Inventors: Edward P. Furlani, Lancaster; Bijan Barzideh, Rush, both of N.Y.

[73] Assignee: Eastman Kodak Company, Rochester, N.Y.

[21] Appl. No.: 748,728

[22] Filed: Nov. 18, 1996

[51] Int. Cl.⁶ .................... G03B 9/02; G03B 9/08
[52] U.S. Cl. .................... 396/449; 396/463; 396/508; 396/510
[58] Field of Search .................... 396/257, 449, 396/463, 505, 508, 510, 455, 458, 459, 460, 467, 468, 469

[56] References Cited

U.S. PATENT DOCUMENTS

| | | | |
|---|---|---|---|
| 4,112,450 | 9/1978 | Kondo | 398/467 |
| 4,505,568 | 3/1985 | Asano et al. | 396/246 |
| 4,760,420 | 7/1988 | Lam | 396/242 |
| 5,159,382 | 10/1992 | Lee et al. | 396/242 |
| 5,325,142 | 6/1994 | Depatie et al. | 396/449 |
| 5,337,110 | 8/1994 | Dowe | 396/449 |
| 5,432,576 | 7/1995 | San Gregory et al. | 396/449 |

*Primary Examiner*—A. A. Mathews
*Attorney, Agent, or Firm*—Raymond L. Owens

[57] ABSTRACT

An hard stop for use with an aperture mechanism includes at least one blade moveable along a path between a closed position and at least one open position. At least one hard stop piston is moveable between a first position, out of the blade path, and a second position, in the blade path, to position the blade in the open position when an edge of the blade contacts the hard stop piston. The hard stop includes a magnetic piston, an electromagnet coil proximate to the magnetic piston, and a ferromagnetic ring arranged such that when current is applied in one direction through the coil it causes the magnetic piston to move to the first position in a first direction and held in such position by the attraction of the magnetic piston to the ferromagnetic ring and causes the magnetic piston to move to the second position when current is applied in an opposite direction to the coil and the magnetic piston is held in such position by the attraction of the magnetic piston to the ferromagnetic ring.

8 Claims, 8 Drawing Sheets

ELECTROMAGNETIC ACTUATOR FOR PROVIDING A HARD STOP FOR MOVING BLADE APERTURE SYSTEMS

CROSS REFERENCE TO RELATED APPLICATIONS

The present invention is related to commonly assigned U.S. patent application Ser. No. 08/655,366, filed May 30, 1996, entitled "Electromagnetic Mechanism for Providing a Hard Stop for Moving Blade Aperture Systems", by Furlani et al., now U.S. Pat. No. 5,619,296 and commonly assigned U.S. patent application Ser. No. 08/751,597 filed concurrently herewith, entitled "Electromagnetic Device for Providing a Hard Stop for Moving Blade Aperture Systems" by Furlani et al., the disclosures of which are incorporated herein by reference.

FIELD OF THE INVENTION

This invention relates generally to the field of photography and, more particularly, to an improved electromagnetic actuated hard stop having utility in aperture blade type mechanisms.

BACKGROUND OF THE INVENTION

U.S. Pat. No. 4,760,420, entitled, "Shutter Mechanism For A Camera" by Lam, discloses a camera shutter mechanism having overlapping plates which are pivotally mounted and connected by a pin sliding in slots in the plates so that the plates move in unison. Springs bias the plates to an overlapping position, covering a hole in the camera body which leads to a lens. One of the plates is struck by a lever which urges the plates against springs causing them to pivot away, until the lever strikes a stop at which point the plates still overlap sufficiently to cover the hole. After the lever strikes the stop the plates continue to move under their own momentum to open up an aperture bound by the edges.

A magnetic control plate with pawls is attracted towards the overlapping plates by an electromagnet so that the pawls engage racks on the plates to arrest the plates at a particular aperture setting. A light metering device or optical sensor is used to determine the position of the plates and thereby to control energization of the electromagnet. The electromagnet must be energized slightly before the desired aperture is reached to allow time for the magnetic control plate to move into the engaged position. When the electromagnet is switched off, the overlapping plates are released which closes the aperture under the action of the springs.

An improvement in the type of shutter shown in the U.S. Pat. No. 4,760,420 patent is disclosed in U.S. Pat. No. 5,432,576, entitled, "Aperture Mechanism Having A Blade Positionable In An Open Position By A Hard Stop" by SanGregory et al. In that patent hard stops are used to define the limits of travel for the aperture plates. The hard stops are positioned in their stopping position by activating an electromagnet that in turn projects a magnet (piston) into the path of the blade. To maintain the piston in that position the electromagnet remains energized. To retract the piston the current flowing through the electromagnet is reversed.

SUMMARY OF THE INVENTION

It is an object of the present invention to minimizing the current draw that is needed to actuate and to hold the piston in place as the current is drawn, generally, from a battery.

This object is achieved by an improved hard stop for use with an aperture mechanism that is comprised of at least one blade moveable along a path between a closed position and at least one open position, and at least one hard stop piston that is moveable between a first position, out of the blade path, and a second position, in the blade path, to position the blade in the open position when an edge of the blade contacts the hard stop piston, wherein the improved hard stop is comprised of:

a magnetic piston;

electromagnet means including a coil proximate to the magnetic piston and a ferromagnetic ring arranged such that when current is applied in one direction through the coil it causes the magnetic piston to move to the first position in a first direction and held in such position by the attraction of the magnetic piston to the ferromagnetic ring and causes the magnetic piston to move to the second position when current is applied in an opposite direction to the coil and the magnetic piston is held in such position by the attraction of the magnetic piston to the ferromagnetic ring.

ADVANTAGES

The hard stop of the present invention has a greatly reduced power consumption relative to the current hard stop mechanisms. Additionally, the present hard stop is highly reliable, and easy to manufacture. By using a ferromagnetic ring, separate magnets for maintaining the magnetic piston in its first or upper position or its second or lower position are no longer necessary.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
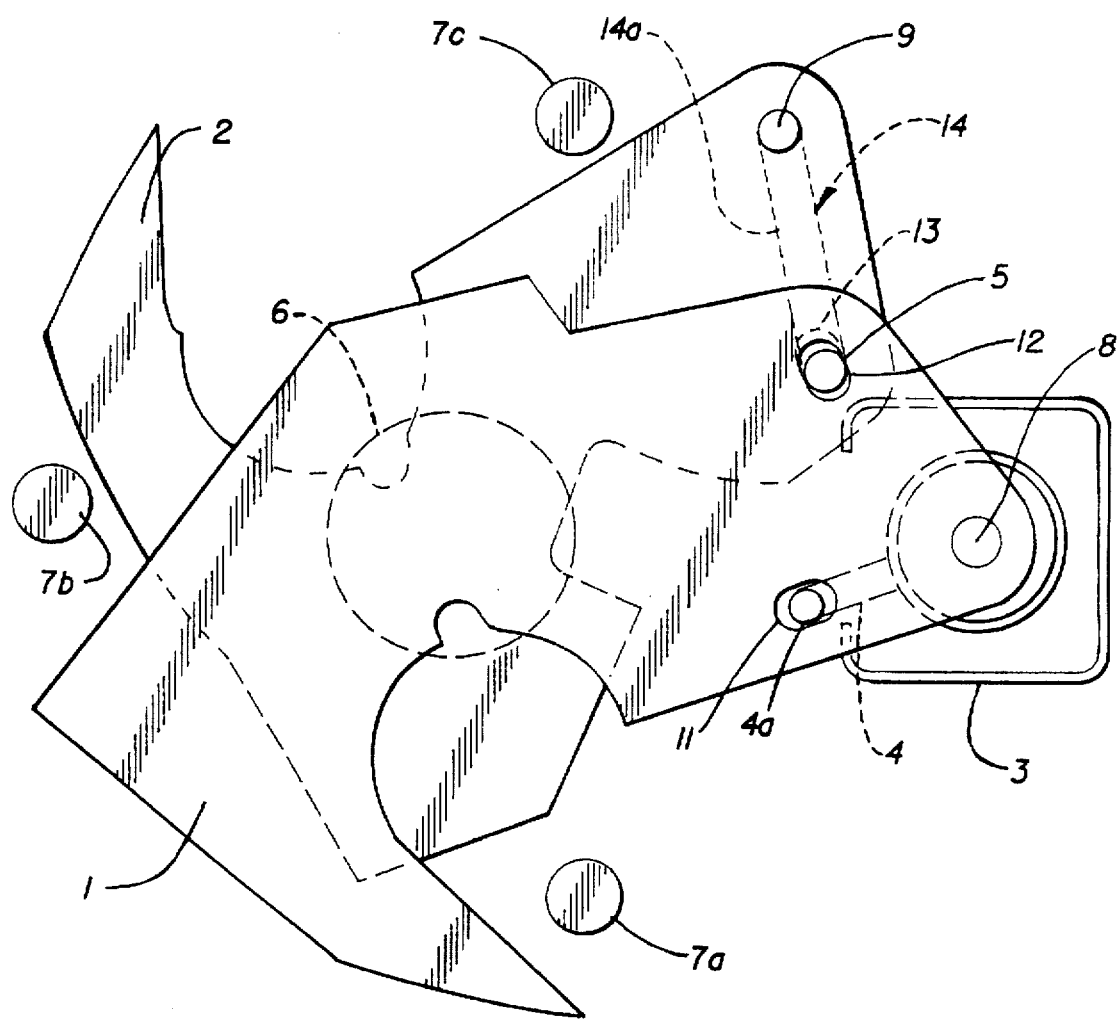
FIGS. 1–5 are top views of a prior art aperture mechanism wherein the present invention finds particular utility.
Figure 2:
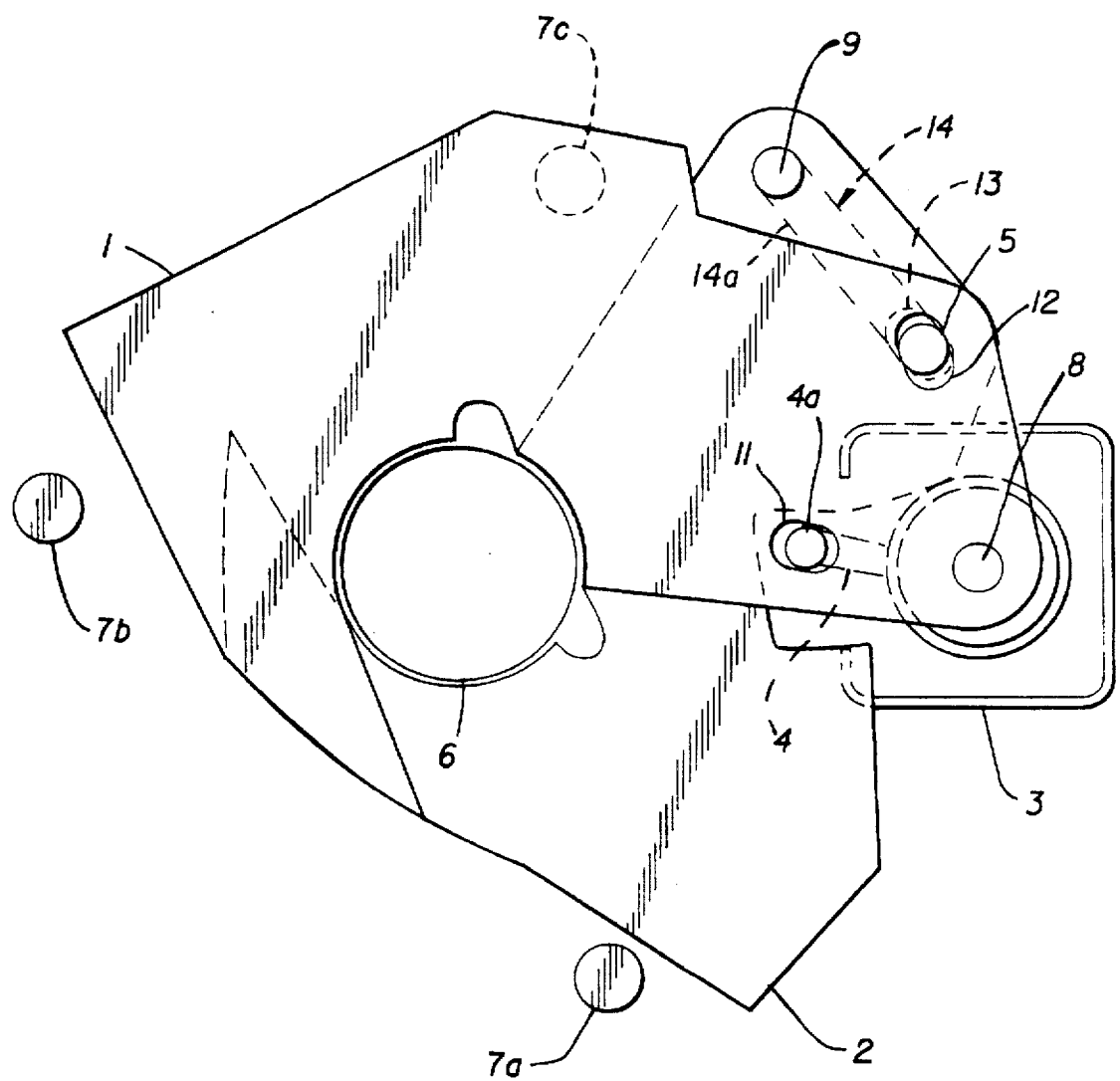

Referring now to FIGS. 1 and 2 which show top views of one embodiment of the present invention. A pair of aperture blades (blades 1 and 2), are displayed in a closed position in FIG. 1. In this position, blades 1 and 2 block light from passing through a camera aperture 6. In FIG. 2 the blades are shown in the fully opened position (aperture 6 is fully uncovered). An actuator 3, used to rotate blade 1, includes an arm 4 to which is connected a pin 4a that fits through a slot 11 in blade 1. A pivot point 8 for blade 1 lies along the axis of rotation for actuator 3. Thus, blade 1 directly follows the rotation of actuator 3.

A link 14 acts as a pivot point for blade 2 at a position 9. Link 14 includes a pin 5 and an arm 14a to which the pin is connected. Pin 5 fits through slots (apertures) 12 and 13 of blades 2 and 1 respectively, thus rotating with blade 2 as it causes blade 2 to follow the motion of blade 1 at this point. It can be seen that as blade 1 rotates clockwise blade 2 is caused to rotate counter-clockwise and vice-versa. Hard stop pistons, 7a, 7b, and 7c, will be described in detail in the description of FIGS. 3, 4, and 5.

Actuator 3 is preferably a rotary magnetic actuator or solenoid. Magnetic attraction torque within actuator 3 keeps the blades rotated to the closed condition when the actuator is not energized. Energizing actuator 3 to rotate clockwise drives the blades opened, as described above. Energizing actuator 3 to turn counter-clockwise returns the blades to the closed condition after proper exposure.

Figure 3:
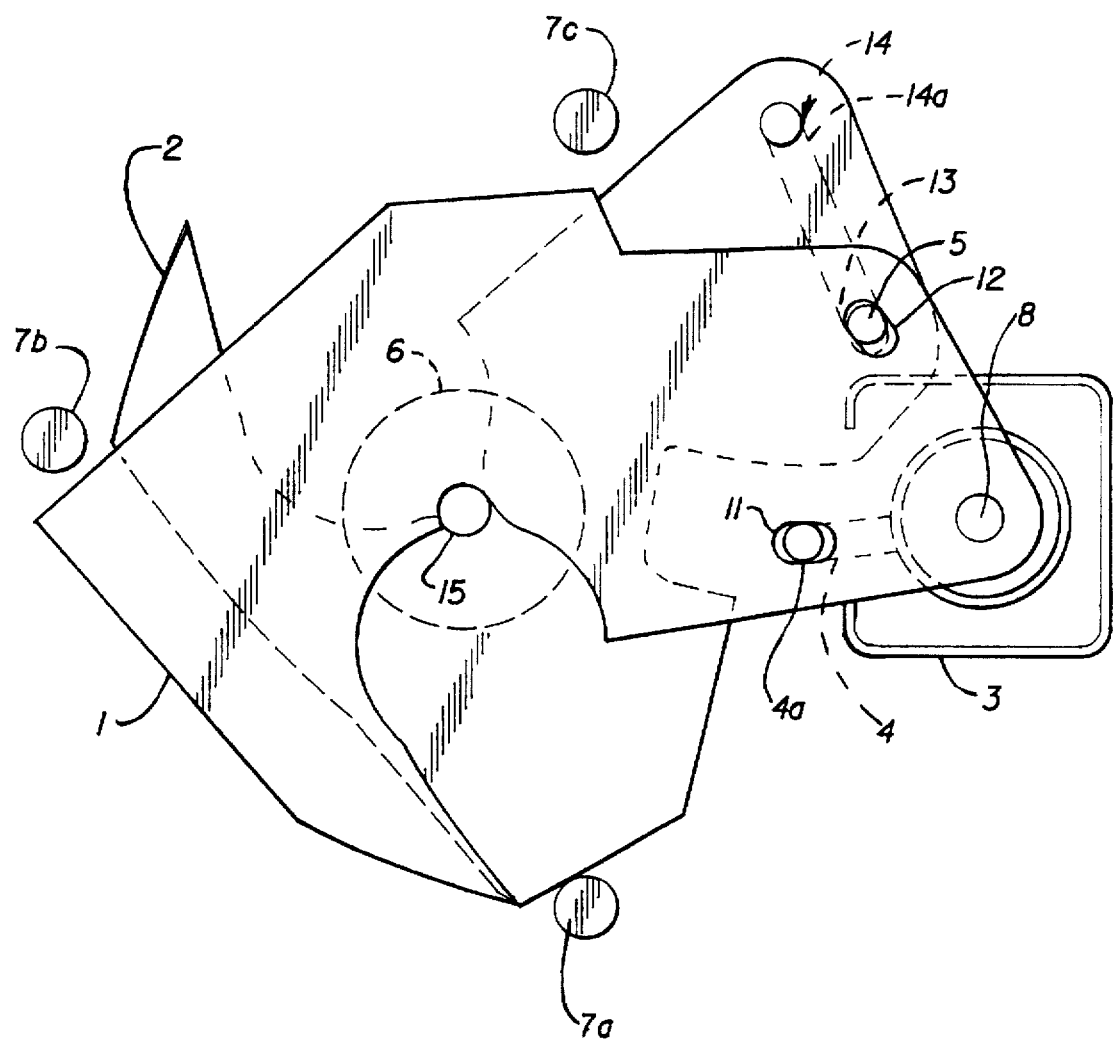
Figure 4:
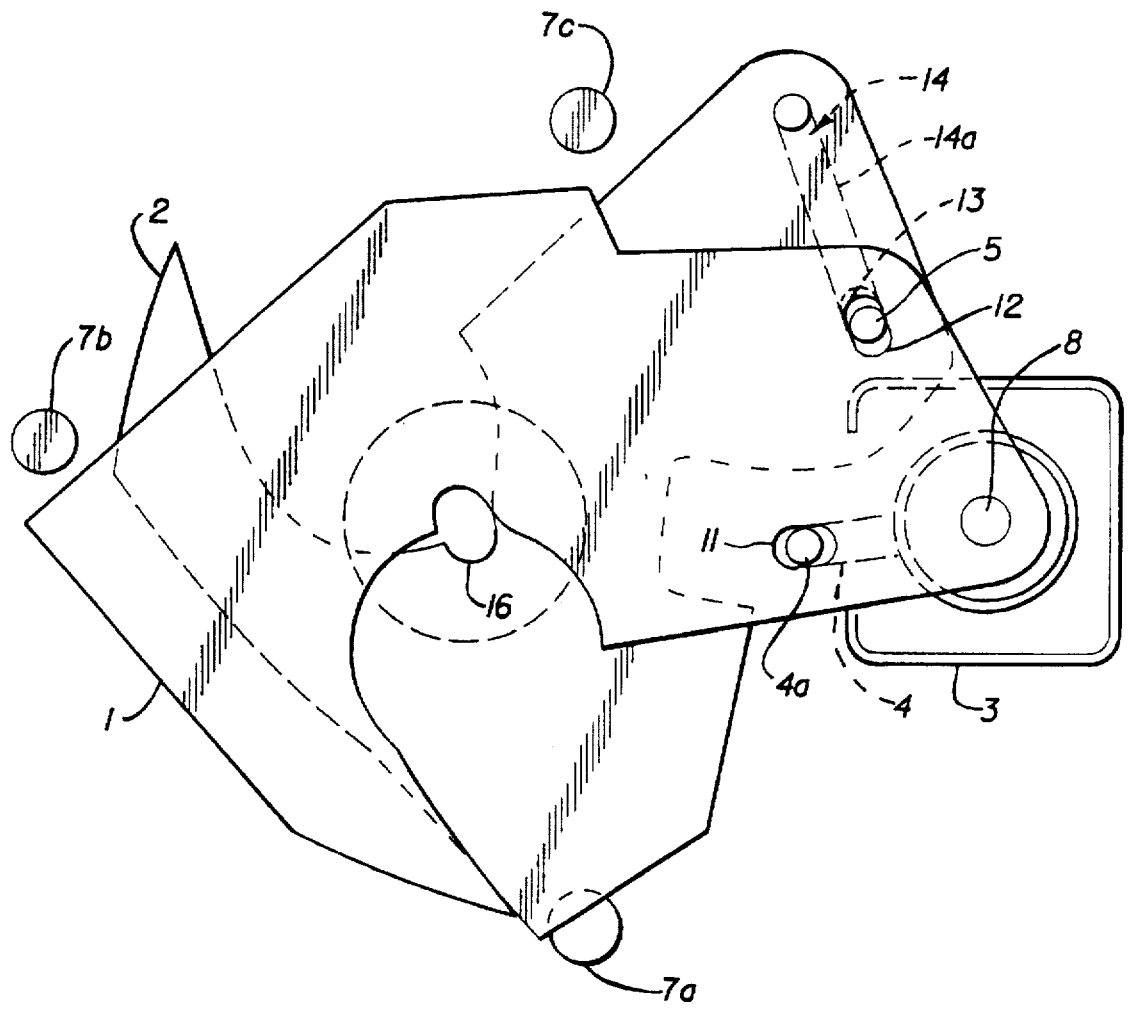
Figure 5:
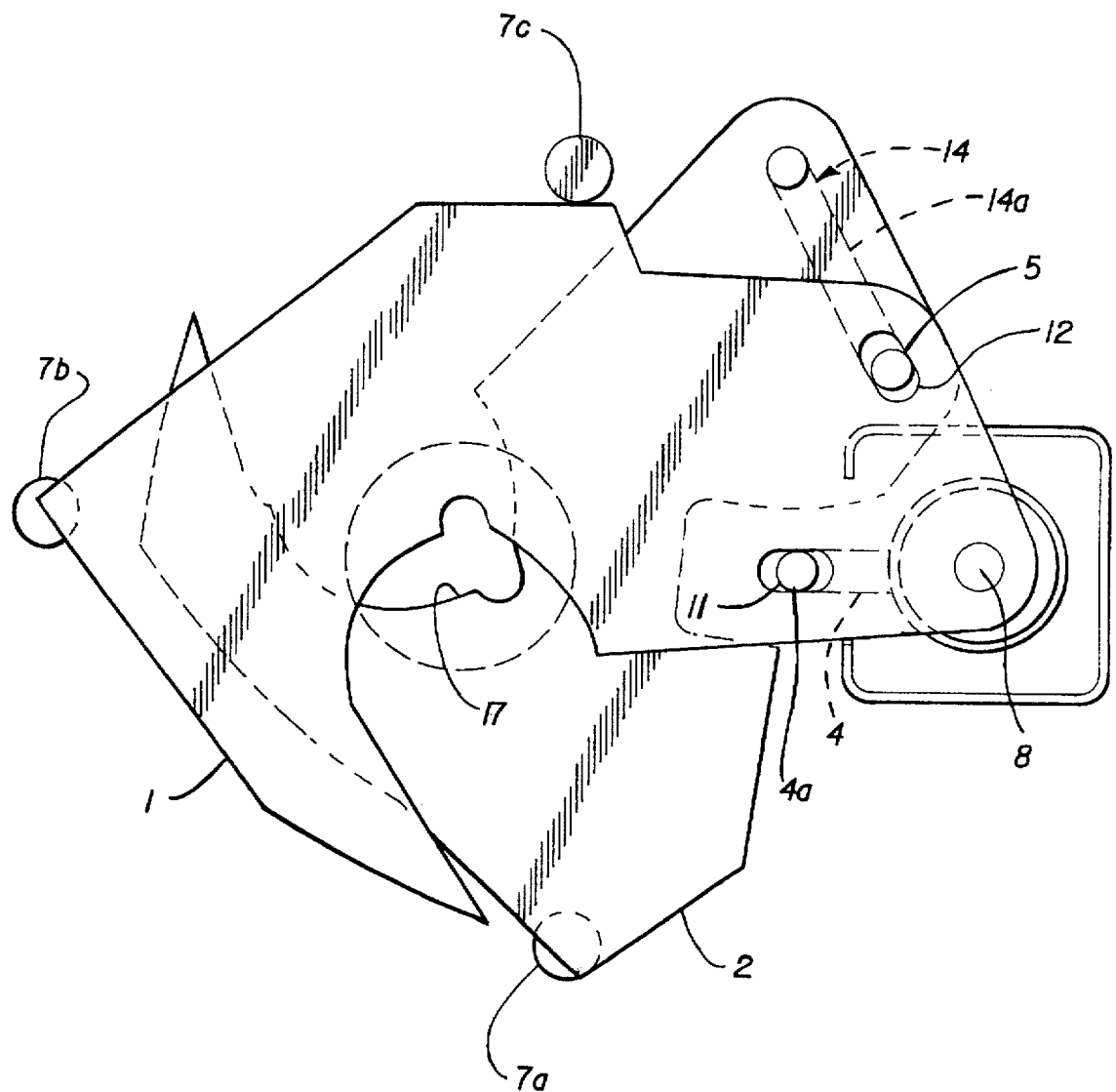

The present invention varies aperture size by using moving hard stop piston to position the blades at discrete degrees of travel. FIGS. 3, 4 and 5 show the shutter opened to three intermediate apertures. In FIG. 3, a hard stop piston 7a, normally out of a plane of rotation of blade 2, is placed in the path of blade 2 to stop the shutter from further opening. Thus, the blades together form an exposure aperture area 15. The geometry of blades 1 and 2 and the position of hard stop pistons 7a–c are selected to minimize bounce of the blades when they strike the pistons.

In FIG. 4, a hard stop piston 7b blocks the path of blade 1, thus exposing an area 16. Piston 7a is not placed in the path of blade 2 in this case or else the blades would stop as shown in FIG. 3. In FIG. 5, a piston 7c stops the shutter to expose area 17. Again, the other two pistons are not employed for this condition and are located out of the plane of rotation of their respective blades.

The hard stop pistons described in the previous paragraphs are preferably made of a permanent magnetic material. These hard stop pistons are moved into the shutter blade path by a magnetic force from nearby coils which are selectively energized. One magnetic hard stop piston is used for each partial aperture (one less than the total number of apertures).

Figure 6A:
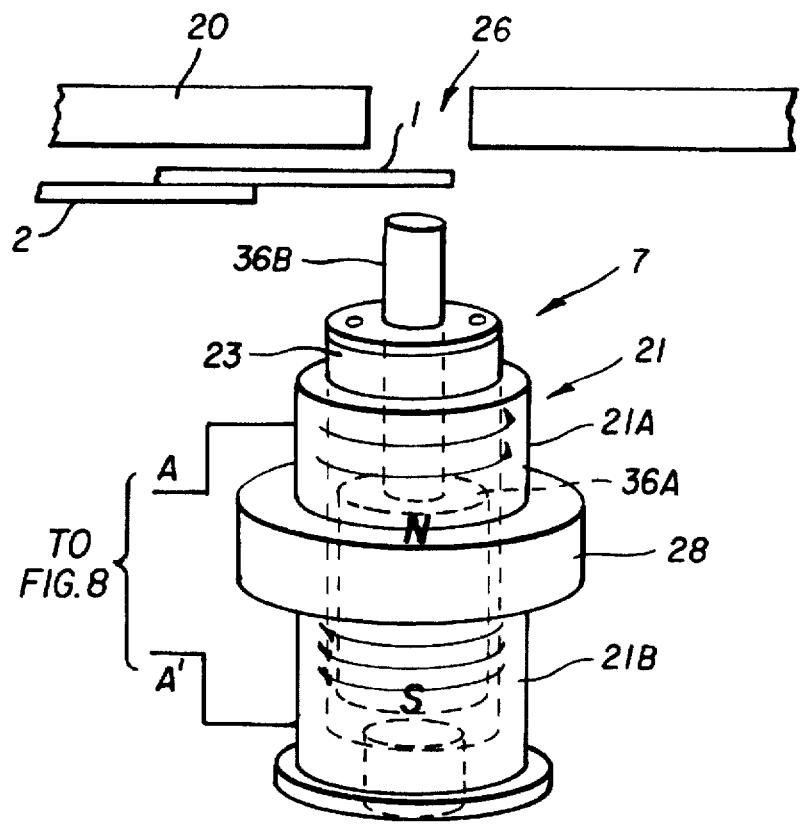
FIGS. 6A and 6B illustrate, in perspective and cross sectional views, the position of the hard stop of the present invention in its non-stopping position.
Figure 6B:
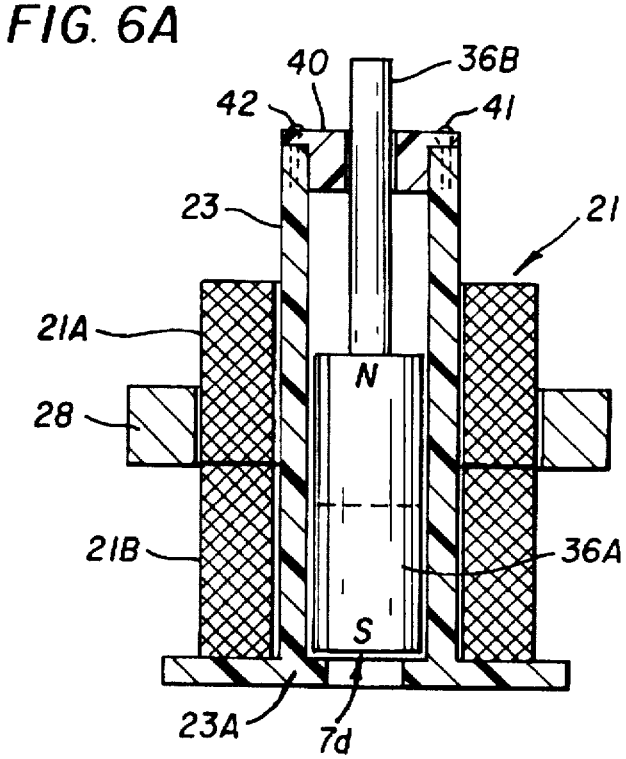

Referring now to FIGS. 6A and 6B, a hard stop 7 is comprised of an electromagnet 21 that is formed by a coil which has two counter-wound portions 21A and 21B supported on a plastic housing 23. The housing 23 mounts to the camera or other device that incorporates the present invention. The piston, 7a, 7b, or 7c, of the hard stop 7 is formed as a cylindrical rod comprising a permanent magnet 36A and a non-magnetic material such as a plastic rod 36B. Although the electromagnet 21 and the piston 7a, 7b, or 7c are cylindrically shaped in cross-section it is understood that other shapes may be utilized without detracting from the invention. A non-magnetic plate 20 having an aperture 26 therein for receiving the end of the piston 7a, 7b, or 7c with the magnet 36A, and positioned to support the shutter blades 1 and 2 in a plane that is transverse to the movement of the piston 7a, 7b, or 7c. A ferromagnetic ring 28 is secured to the coil having counter-wound portions 21A and 21B. It is instructive to note that, in the position shown in FIG. 6B, the magnet 36A is held stationary against the lower stop 23A of the plastic housing 23 by the dominant magnetic attraction of the North pole of magnet 36A to the ferromagnetic ring 28.

Figure 7A:
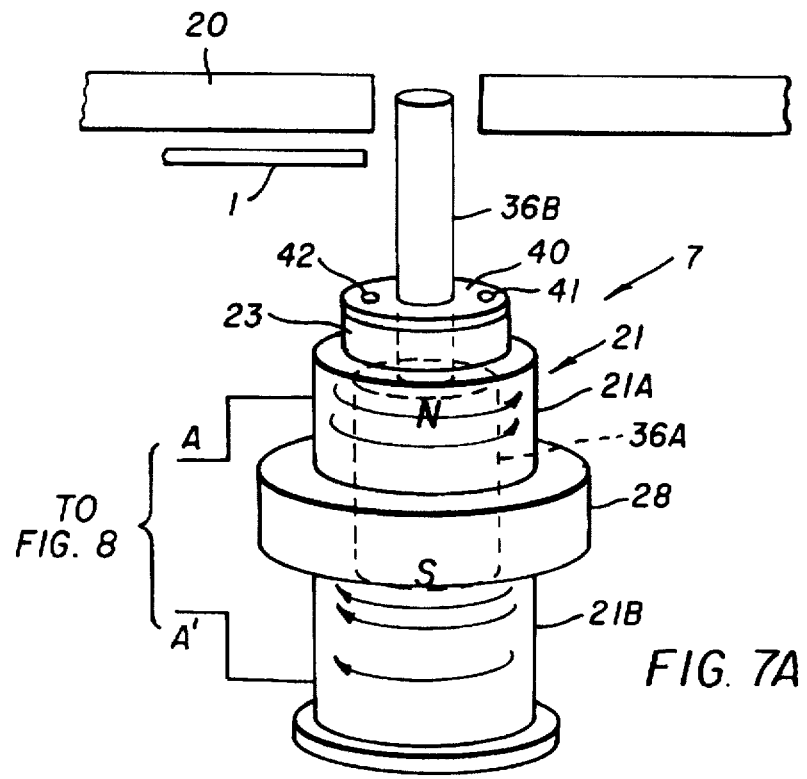
FIGS. 7A and 7B illustrate, in perspective and cross sectional views, the position of the hard stop of the present invention in its stopping position.
Figure 7B:
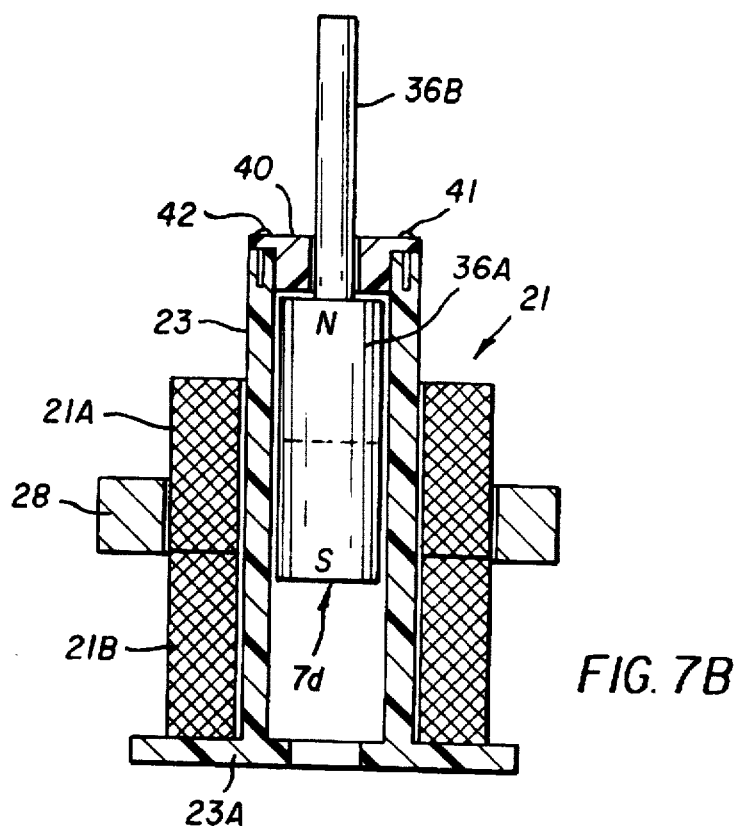

Referring to FIGS. 7A and 7B, a source of current (shown in FIG. 8), causes current to flow through the coil having counter-wound portions 21A and 21B in a first direction which propels the piston 7a, 7b, or 7c into the aperture 26 which in turn limits (stops) the movement of the shutter blade 1 (shown clearly in FIG. 7A). The motion of the piston 7a, 7b, or 7c in response to the current can be understood by considering the interaction of the magnetic field of the electromagnet 21 with the magnetic poles of magnet 36A. Specifically, the coil portion 21A produces a magnetic field substantially along its axis that imparts an upward force in the north pole of magnet 36A. In a similar fashion, the coil portion 21B produces a magnetic field substantially along its axis that imparts an upward force to the south pole of magnet 36A. The magnet 36A moves upwards in response to these forces. When the piston 7a, 7b, or 7c is in this position, the magnet 36A is still held stationary against insert 40, which is fastened to plastic housing 23 with pins 41 and 42, via the dominant magnetic attraction of the South pole of magnet 36A to the ferromagnetic ring 28. The piston 7a, 7b, or 7c is held in this position after the current stops flowing through the coil having counter-wound portions 21A and 21B. As such the stopping function remains in effect without requiring a sustaining current. To move the piston 7a, 7b, or 7c to the nonstopping position the current through the coil having counter-wound portions 21A and 21B is reversed which in turn attracts the piston 7a, 7b, or 7c back into the plastic housing 23, shown in FIGS. 6A and 6B.

Figure 8:
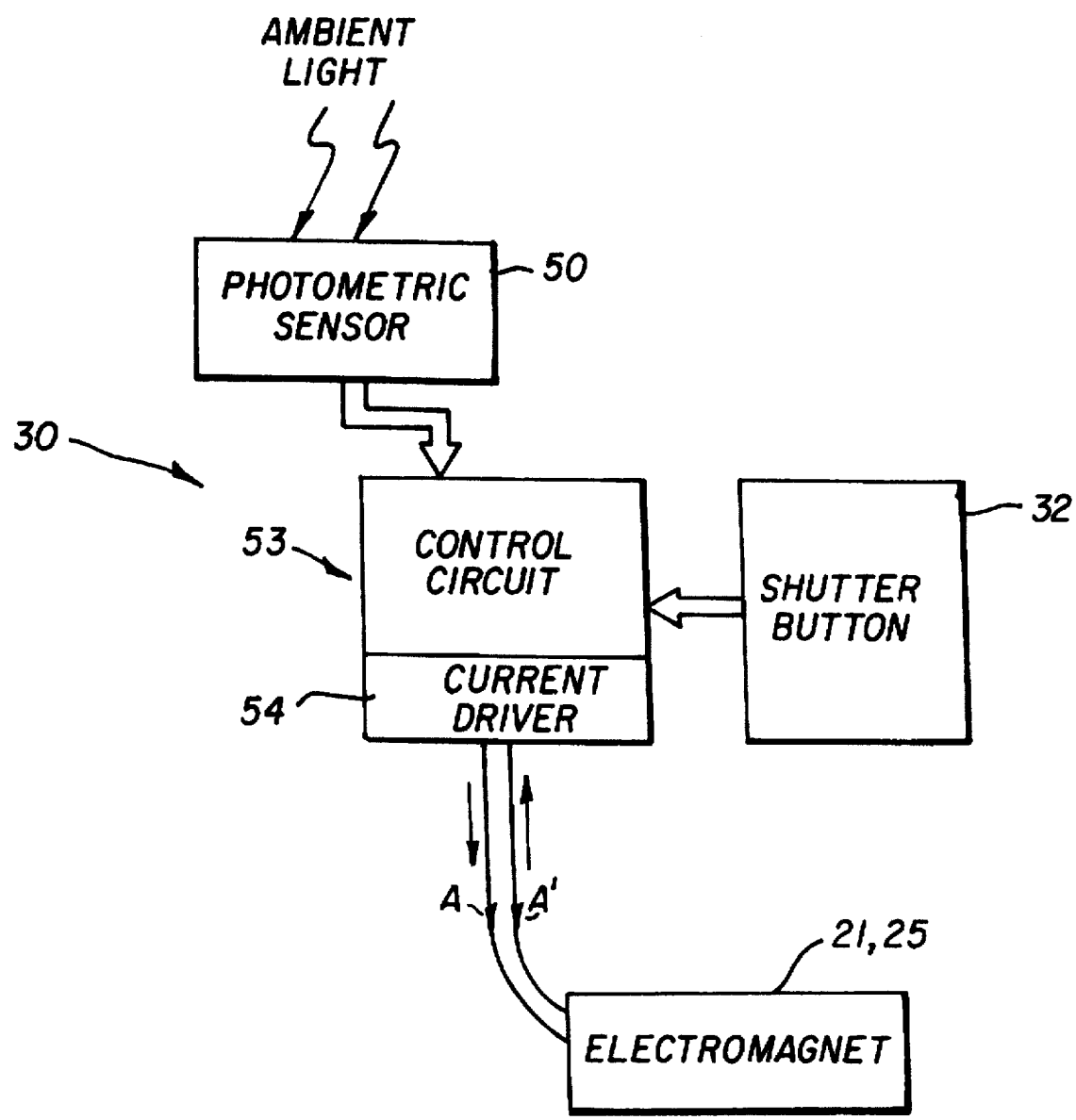
FIG. 8 illustrates, in schematic form, the electronics for controlling the hard stop actuator of the present invention.

Referring now to FIG. 8, the control of the current flow through the electromagnet 21 is adjusted by the circuitry 30. A shutter button 32 provides the initial activation signal to a control circuit 53. An additional input is provided by a photometric sensor 50 which supplies an output indicating a low or a high amount of light being presented to the aperture mechanism. If a low amount of light is present the piston should not stop the blade. If a high amount of light is present the piston is to stop the blade. The control circuit 53 controls a current driver 54 for pulsing current through the electromagnet 21 in the direction that causes the associated piston to take the position indicated by the photometric sensor 50. Once in the proper position the current pulse is no longer necessary to hold the piston in position which provides the major advantage of the present invention namely to reduce the amount of current needed for each shutter operation.

The invention has been described with reference to preferred embodiments. However, it will be appreciated that variations and modifications can be effected by a person of ordinary skill in the art without departing from the scope of the invention.

PARTS LIST 1,2 aperture blades
3 actuator
4 arm
4a, 5 pins
6 aperture
7 hard stop
7a–c hard stop pistons
8 pivot point
9 position
11 slot
12, 13 slots
14 link
14a arm
15, 16, 17 aperture area
20 non-magnetic plate
21 electromagnet
21A, 21B counter-wound coil portions
22 steel plate
23 plastic housing
23A stop
26 aperture
28 ferromagnetic ring
30 circuitry
32 shutter button
36A magnet
36B plastic rod
40 insert
41 pin
42 pin 50 photometric sensor
53 control circuit
54 current driver

We claim:

1. A hard stop for use with an aperture mechanism that is comprised of at least one blade moveable along a path between a closed position and at least one open position, and at least one hard stop piston that is moveable between a first position, out of the blade path, and a second position, in the blade path, to position the blade in the open position when an edge of the blade contacts the hard stop piston, wherein said improved hard stop is comprised of:

a magnetic piston;

electromagnet means including a coil proximate to said magnetic piston and a ferromagnetic ring arranged such that when current is applied in one direction through the coil it causes the magnetic piston to move to the first position in a first direction and held in such position by the attraction of the magnetic piston to the ferromagnetic ring and causes said magnetic piston to move to the second position when current is applied in an opposite direction to the coil and said magnetic piston is held in such position by the attraction of the magnetic piston to the ferromagnetic ring.

2. The hard stop of claim 1 wherein said magnetic piston moves in a direction essentially perpendicular to said path of movement of said blade when said piston moves between the first and the second positions.

3. The hard stop of claim 1 wherein said magnetic piston is formed of a magnetic central portion with a non-magnetic poriton on one side of the magnetic central portion.

4. The hard stop of claim 3 and further comprising a non-magnetic material positioned on at least one end of said magnetic central portion.

5. The hard stop of claim 1 wherein said coil includes two counter-wound portions defining a central opening.

6. The hard stop of claim 5 wherein said magnetic piston is formed as an elongated cylinder that is positioned within the central opening.

7. The hard stop of claim 1 and further comprising:

control means responsive to an input for applying a current to said electromagnet means in said first direction upon receipt of a first input and for applying a current to said electromagnet means in said second direction upon receipt of a second input.

8. The improved hard stop of claim 7 and further comprising a photometric means for sensing light to be controlled by the aperture mechanism for providing said first input to said control means when the level of light is above a first level and for providing said second input to said control means when the level of light is below said first level.

* * * * *